United States Patent [19]

Lenhart

[11] Patent Number: 5,328,611
[45] Date of Patent: Jul. 12, 1994

[54] FILTERING APPARATUS WITH ROTATABLE FILTER DRUM

[75] Inventor: Thomas W. Lenhart, Rockton, Ill.

[73] Assignee: Barnes International, Inc., Rockford, Ill.

[21] Appl. No.: 905,002

[22] Filed: Jun. 26, 1992

[51] Int. Cl.⁵ .................... B01D 33/06; B01D 35/16
[52] U.S. Cl. .................... 210/393; 210/396; 210/402
[58] Field of Search ............ 210/393, 394, 396, 402, 210/297, 401

[56] References Cited

U.S. PATENT DOCUMENTS

| | | | |
|---|---|---|---|
| 3,029,948 | 4/1962 | McKay | 210/402 |
| 4,895,647 | 1/1990 | Uchiyama | 210/171 |
| 4,992,167 | 2/1991 | Uchiyama | 210/171 |
| 5,167,839 | 12/1992 | Widmer, II et al. | 210/784 |
| 5,173,185 | 12/1992 | Stokes | 210/393 |
| 5,213,685 | 5/1993 | Padovan | 210/402 |

FOREIGN PATENT DOCUMENTS

| | | | |
|---|---|---|---|
| 3044843 | 9/1981 | Fed. Rep. of Germany | 210/393 |
| 59-123507 | 7/1984 | Japan | 210/393 |
| 1437074 | 11/1988 | U.S.S.R. | 210/393 |
| 146891 | 1/1921 | United Kingdom | 210/393 |

OTHER PUBLICATIONS

Brochure entitled Kleenall Chip Filter, Published by Barnes International, Inc. 1991.

*Primary Examiner*—Wilbur Bascomb, Jr.
*Attorney, Agent, or Firm*—Leydig, Voit & Mayer

[57] ABSTRACT

A filter drum with a tubular filter belt is journaled for rotation on a pipe which serves to supply filtered coolant to spray nozzles located within the drum and operable to backwash the filter belt.

4 Claims, 2 Drawing Sheets

FILTERING APPARATUS WITH ROTATABLE FILTER DRUM

BACKGROUND OF THE INVENTION

This invention relates in general to apparatus for filtering dirty liquid such as machine tool coolant which contains metal chips and particles. More specifically, the invention relates to filtering apparatus of the same general type as disclosed in Uchiyama U.S. Pat. No. 4,992,167.

In the apparatus disclosed in the Uchiyama patent, a rotatable drum with a filtering screen is supported within a reservoir and is partially immersed in a pool of dirty liquid. Liquid from that pool flows into the drum through the screen and is filtered by the screen. The filtered liquid flows axially out of the drum through outlet openings in one end wall of the drum and an adjacent end wall of the reservoir. Part of the filtered liquid is pumped to a pipe located within the drum and having spray nozzles for directing the filtered liquid against the screen in order to flush and clean the screen.

One end wall of the filter drum of the Uchiyama patent is fixed to a shaft which is driven in order to rotate the drum. The other end wall of the drum is formed in part by a large ring which is journaled to rotate within a large sleeve supported by a wall of the reservoir, the ring and the sleeve coacting to form the discharge openings for the filtered liquid. This arrangement for rotatably supporting the drum is rather complex and expensive and particularly when a screen-flushing pipe is located within the drum.

SUMMARY OF THE INVENTION

The general aim of the present invention is to provide new and improved filtering apparatus of the above general type in which the filter drum is rotatably supported within the reservoir in a simpler, less expensive and more reliable manner.

A more detailed object of the invention is to achieve the foregoing by supporting the drum for rotation on a single rotationally stationary shaft-like member which extends through the drum and is solidly supported at both ends by the walls of the reservoir.

Still another object is to use the shaft-like member which supports the drum to conduct filtered liquid to spray nozzles for flushing the filter screen and thereby avoid the need for a separate pipe within the drum.

The invention also resides in the spider-like construction of one end wall of the drum to enable the drum to be journaled on the shaft-like member while permitting filtered liquid to discharge axially from the drum through the end wall.

These and other objects and advantages of the invention will become more apparent from the following detailed description when taken in conjunction with the accompanying drawings.

DETAILED DESCRIPTION OF THE PREFERRED EMBODIMENT

For purposes of illustration, the invention has been shown as embodied in apparatus 10 for filtering dirty liquid and for producing a flow of clean liquid. The liquid may, for example, be machine tool coolant which is contaminated with metallic chips and particles.

Figure 1:
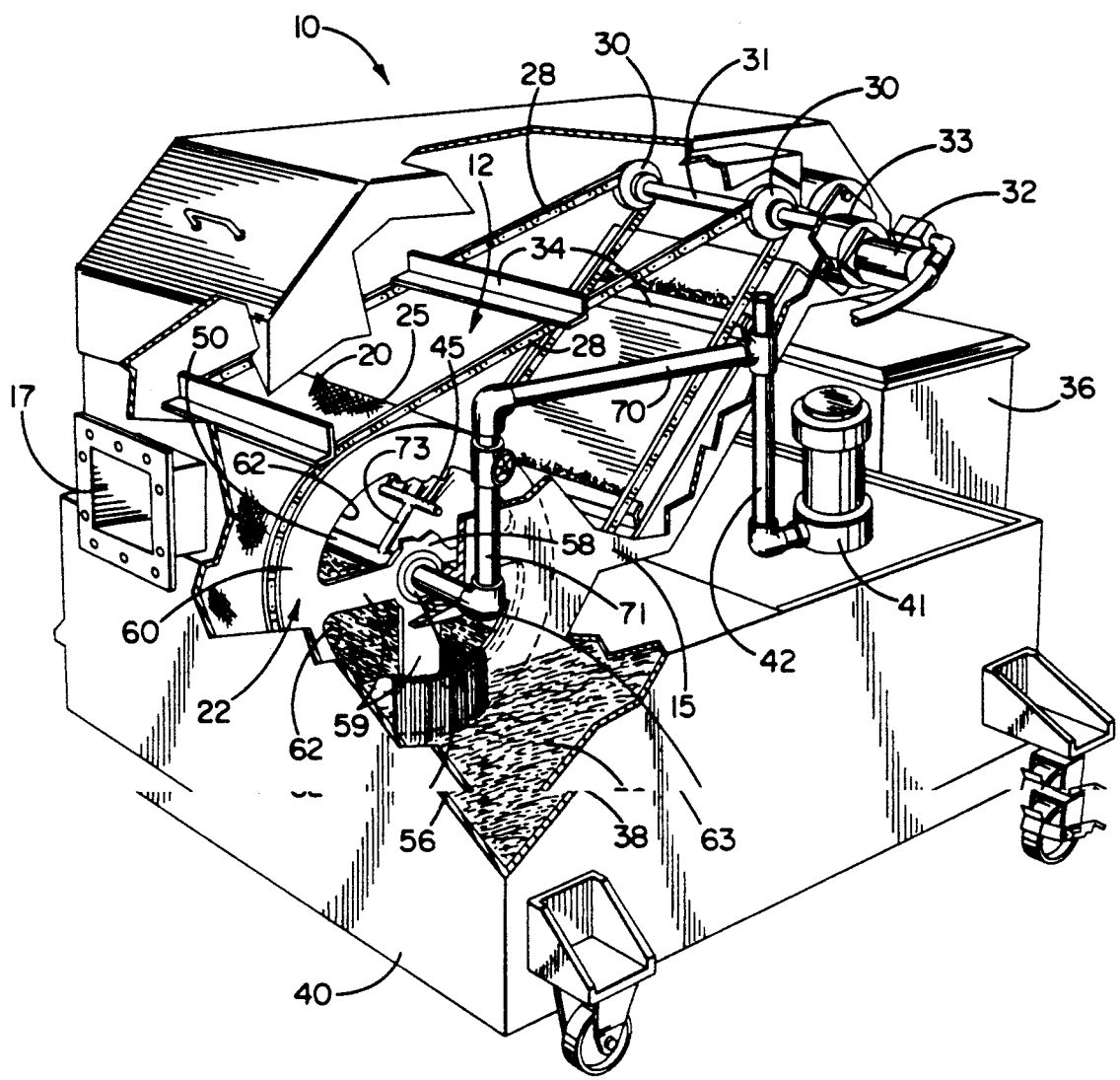
FIG. 1 is a perspective view of new and improved filtering apparatus incorporating the unique features of the present invention, portions of the apparatus being broken away for purposes of clarity.
Figure 2:
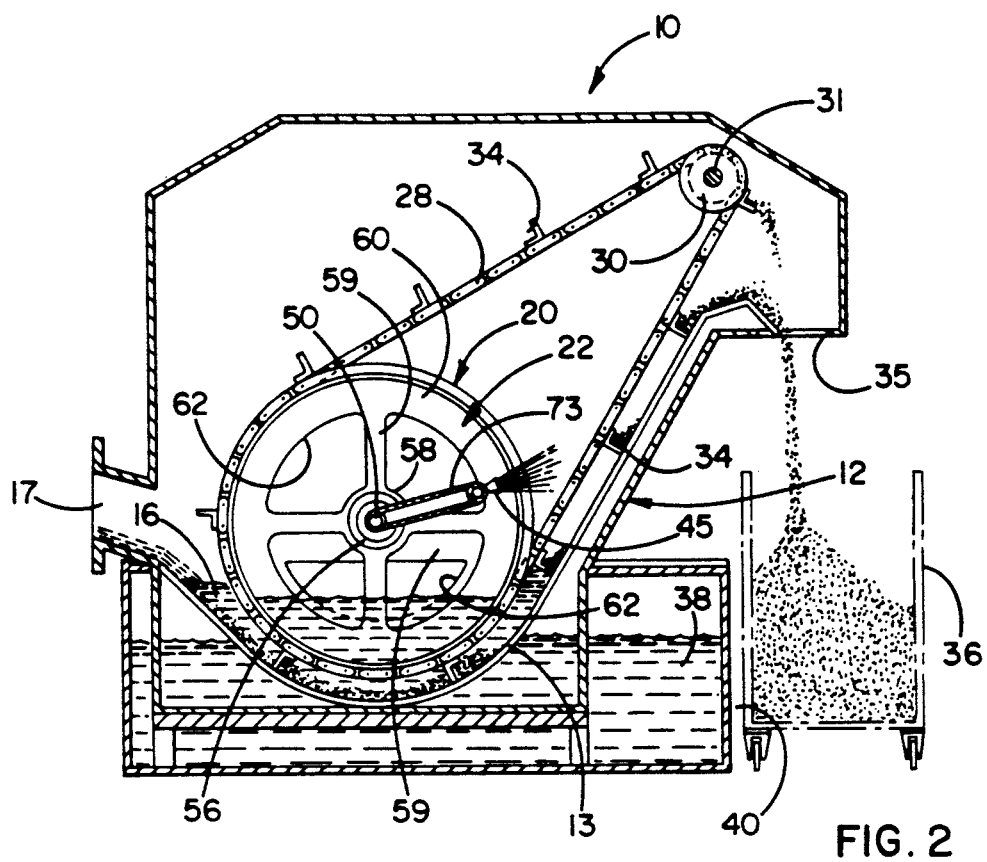
FIGS. 2 and 3 are cross-sectional views of the filtering apparatus.

The filtering apparatus 10 includes a dirty coolant reservoir 12 defined in part by a bottom wall 13 (FIG. 3) and by a pair of laterally spaced side walls 14 and 15 and containing a pool 16 of dirty coolant, the latter entering the reservoir by way of an inlet 17 (FIGS. 1 and 2). A filter drum 20 is located between the side walls 14 and 15 and is partially immersed in the pool 16 of dirty coolant. The drum includes a pair of generally cylindrical and laterally spaced end walls 21 and 22 disposed in spaced opposing relation with the reservoir walls 14 and 15, respectively, and further includes a tubular filter element 25 extending between the end walls 21 and 22 adjacent the outer peripheries thereof. Herein, the filter element is a fine screen mesh belt.

The drum 20 is adapted to be rotated within the reservoir 12 and, in this particular instance, the rotation is effected by a pair of laterally spaced chains 28 operably engaged with the outside of the drum and with a pair of drive sprockets 30. A shaft 31 supports the sprockets and is adapted to be rotated by a motor 32 acting through a speed reducer 33.

Heavy chips in dirty coolant entering the inlet 17 settle to the bottom 13 of the reservoir 12 and are carried upwardly by drag bars 34 (FIGS. 1 and 2) which span the chains 28. Such chips are discharged through an opening 35 (FIG. 2) and are dumped into a hand cart 36 which may be periodically dumped.

Lighter chips and fine particles in the dirty pool 16 are filtered by the belt 25 as the coolant passes upwardly through the belt and into the interior of the drum 20. Clean coolant which is filtered by the belt 25 flows axially out of one end of the drum and collects as a pool 38 in a clean coolant tank 40. A pump 41 (FIG. 2) in the tank 40 delivers the clean coolant to machine tools or other utilization devices by way of a pipe 42.

Part of the clean coolant is pumped to spray nozzles 45 located inside of the drum 20 and directed toward the inner face of the filter belt 25. As the drum rotates, the clean coolant from the nozzles 45 continuously backwashes the belt to flush filtered out particles therefrom. Such particles accumulate on the bottom wall 13 of the reservoir 12 and are carried away by the drag bars 34 in the form of sludge.

According to the present invention, the drum 20 is supported in the reservoir 12 in a simpler and more reliable manner than has been the case with prior filter apparatus of the same general type. Moreover, the drum 20 is supported in such a fashion that clean coolant for backwashing the filter belt 25 may be supplied to the spray nozzles 45 without need of a pipe dedicated solely for that purpose.

More specifically, the foregoing is achieved by journaling the drum 20 for rotation on an elongated shaft-like member which preferably is in the form of a hollow pipe 50. As shown most clearly in FIG. 3, the pipe 50 extends laterally between the side walls 14 and 15 of the reservoir 12. One end portion of the pipe is supported solidly and non-rotationally by a reinforcing collar 51 welded to the inner face of the side wall 14. The other end portion of the pipe is similarly supported by a reinforcing collar 52 on the inner face of a plate 15A detachably secured to the side wall 15 and covering a relatively large opening therein. A locking screw 53 extends through the collar 52 and engages the pipe to insure against endwise movement of the pipe.

Figure 3:
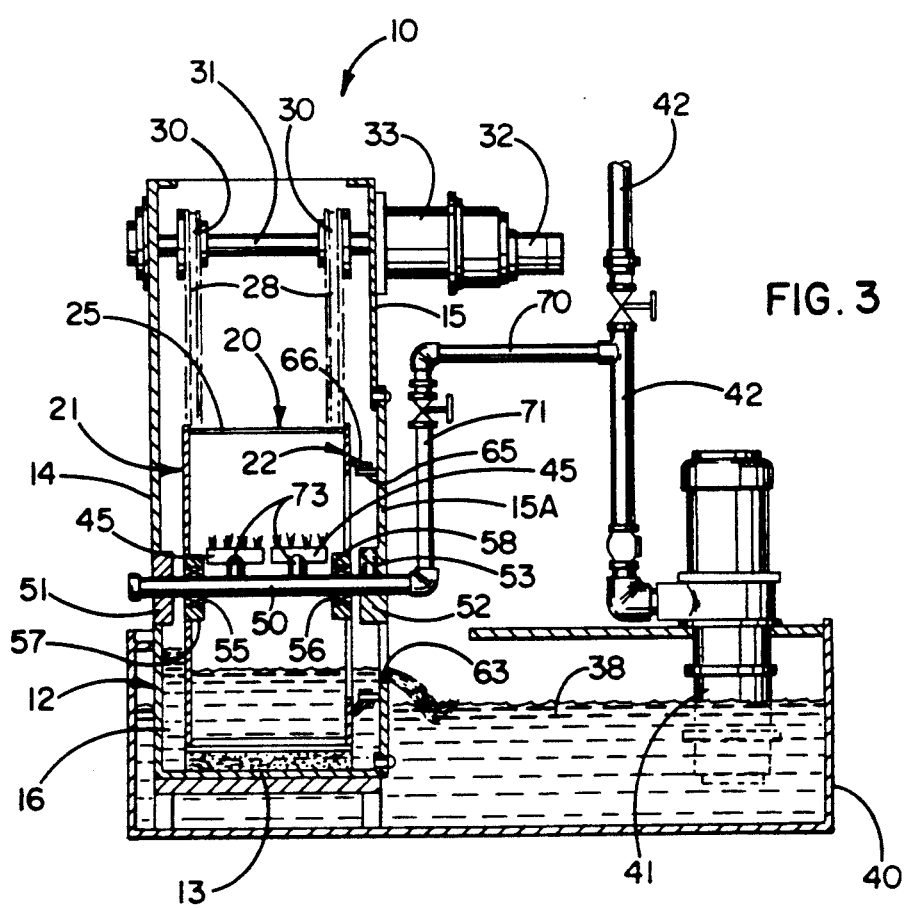

In carrying out the invention, the drum 20 is journaled on the rotationally stationary pipe 50 by bearings 55 and 56 (FIG. 3). The bearing 55 is located between the pipe and a hub 57 on the inboard face of the end wall 21 of the drum, that end wall being a non-perforated member except for the opening to accommodate the pipe. The opposite end wall 22, however, is in the form of a spider and includes a central hub 58 (FIG. 1), four angularly spaced spokes 59 radiating outwardly from the hub, and an outer rim 60 extending circumferentially around the outer end portions of the spokes. The bearing 56 is located between the pipe 50 and the hub 58 so as to journal the end wall 22 on the pipe.

By virtue of the spokes 59, four angularly spaced outlet openings 62 (FIGS. 1 and 2) are formed in the end wall 22. Such openings permit filtered coolant in the drum 20 to be discharged axially out of the drum through the end wall 22. The outlet openings 62 communicate with an outlet opening 63 (FIG. 3) in the plate 15A of the side wall 15 of the reservoir 12 and located just above the clean coolant tank 40. As a result, filtered coolant spills out of the drum and into the tank 40 via the outlet openings 62 and 63.

Means are provided for sealing the end wall 22 of the drum 20 to the removable side plate 15A of the reservoir 12 radially outwardly of the outlet openings 62 in order to prevent dirty coolant in the pool 16 from entering the drum via the outlet openings and to prevent filtered coolant discharged through the outlet openings from spilling into the dirty pool. Herein, these means comprise a relatively large circular sleeve 65 (FIG. 3) fixed to and projecting inwardly from the inboard face of the side plate 15A of the reservoir 12. An annular sealing gasket 66 is fixed to the outer periphery of the sleeve 65 radially outwardly of the outlet openings 62 and presses resiliently against the rim 60 of the end wall 22 so as to establish a seal which prevents coolant from flowing between the dirty pool 16 and the outlet openings 62.

Advantageously, the pipe 50 which supports the drum 20 communicates with the clean coolant pipe 42 from the pump 41 by way of pipes 70 and 71. As a result, part of the clean coolant from the tank 40 is pumped into the pipe 50. The spray nozzles 45 are connected to and communicate with the pipe 50 by means of pipes 73. Thus, coolant which is pumped into the pipe 50 is discharged out of the spray nozzles 45 and serves to backwash the filter belt 25.

From the foregoing, it will be apparent that the present invention brings to the art a new and improved filtering apparatus 10 in which the drum 20 is journaled for rotation on the solidly supported pipe 50 which also serves to deliver clean coolant to the spray nozzles 45. As a result, the mounting structure for the drum is of reliable but relatively simple and low cost construction and totally eliminates the need of equipping the filtering apparatus with a separate backwashing pipe.

I claim:

1. Apparatus for filtering dirty liquid, said apparatus comprising a reservoir adapted to contain a pool of dirty liquid and defined at least in part by a pair of laterally spaced walls, a generally cylindrical drum located within said reservoir and at least partially immersed in said pool, said drum comprising a pair of laterally spaced end walls and further comprising an annular filter element located between said end walls, dirty liquid in said pool being filtered upon flowing through said element and into said drum, outlet openings in one end wall of said drum and the adjacent wall of said reservoir for discharging filtered liquid from said drum, means for rotatably supporting said drum, said means comprising a rotationally stationary shaft-like member extending between and fixed relative to the walls of said reservoir and further comprising bearings located between said member and the end walls of said drum and journaling said drum for rotation on said member, means for rotating said drum on said member, and seal means coacting between said one end wall of said drum and said adjacent wall of said reservoir for preventing liquid from flowing between said pool and said outlet openings, said seal means comprising a rotationally stationary sleeve projecting into said reservoir from said adjacent wall of said reservoir, and a yieldable annular sealing gasket on the outer periphery of said sleeve and resiliently engaging said one end wall of said drum around an annular area located radially outwardly of said outlet openings.

2. Apparatus as defined in claim 1 in which said member comprises a pipe, spray nozzles fixed to and communicating with said pipe, said nozzles being located within said drum and being directed toward said filter element, and means for pumping filtered liquid into said pipe and through said nozzles to clean said filter element.

3. Apparatus as defined in claim 1 in which said one end wall of said drum is a spider having a hub supporting one of said bearings, having a plurality of angularly spaced spokes extending radially outwardly from said hub and having a rim extending circumferentially around said spokes, the outlet openings in said one end wall being defined between said spokes.

4. Apparatus for filtering dirty liquid, said apparatus comprising a reservoir adapted to contain a pool of dirty liquid and defined at least in part by a pair of laterally spaced walls, a generally cylindrical drum rotatable within said reservoir and at least partially immersed in said pool, said drum comprising a pair of laterally spaced end walls and further comprising a filter element located between and extending circumferentially of said end walls, dirty liquid in said pool being filtered upon flowing through said element and into said drum, outlet openings in one end wall of said drum and the adjacent wall of said reservoir for discharging filtered liquid axially from said drum, seal means coacting between said one end wall of said drum and said adjacent wall of said reservoir for preventing liquid from flowing between said pool and said outlet openings, means rotatably supporting said drum within said reservoir, said supporting means comprising an elongated and rotationally stationary pipe extending axially through said drum and extending between and fixed relative to the walls of said reservoir, said supporting means further comprising bearings located between said pipe and the end walls of said drum and journaling said drum for rotation on said pipe, spray nozzles fixed to and communicating with said pipe, said nozzles being located within said drum and being directed toward said filter element, and means for pumping filtered liquid into said pipe and through said nozzles to clean said filter element, said one end wall of said drum comprising a spider having a hub supporting one of said bearings, having a plurality of angularly spaced spokes extending radially outwardly from said hub and having a rim extending circumferentially around said spokes, the outlet openings in said one end wall being defined between said spokes, said seal means comprising a rotationally stationary sleeve projecting into said reservoir from said adjacent wall of said reservoir, and a yieldable sealing gasket carried by the outer periphery of said sleeve and resiliently engaging said rim.

* * * * *